H. GROSS.
Breech-Loading Fire-Arm.
No. 25,259.
Patented Aug. 30, 1859.
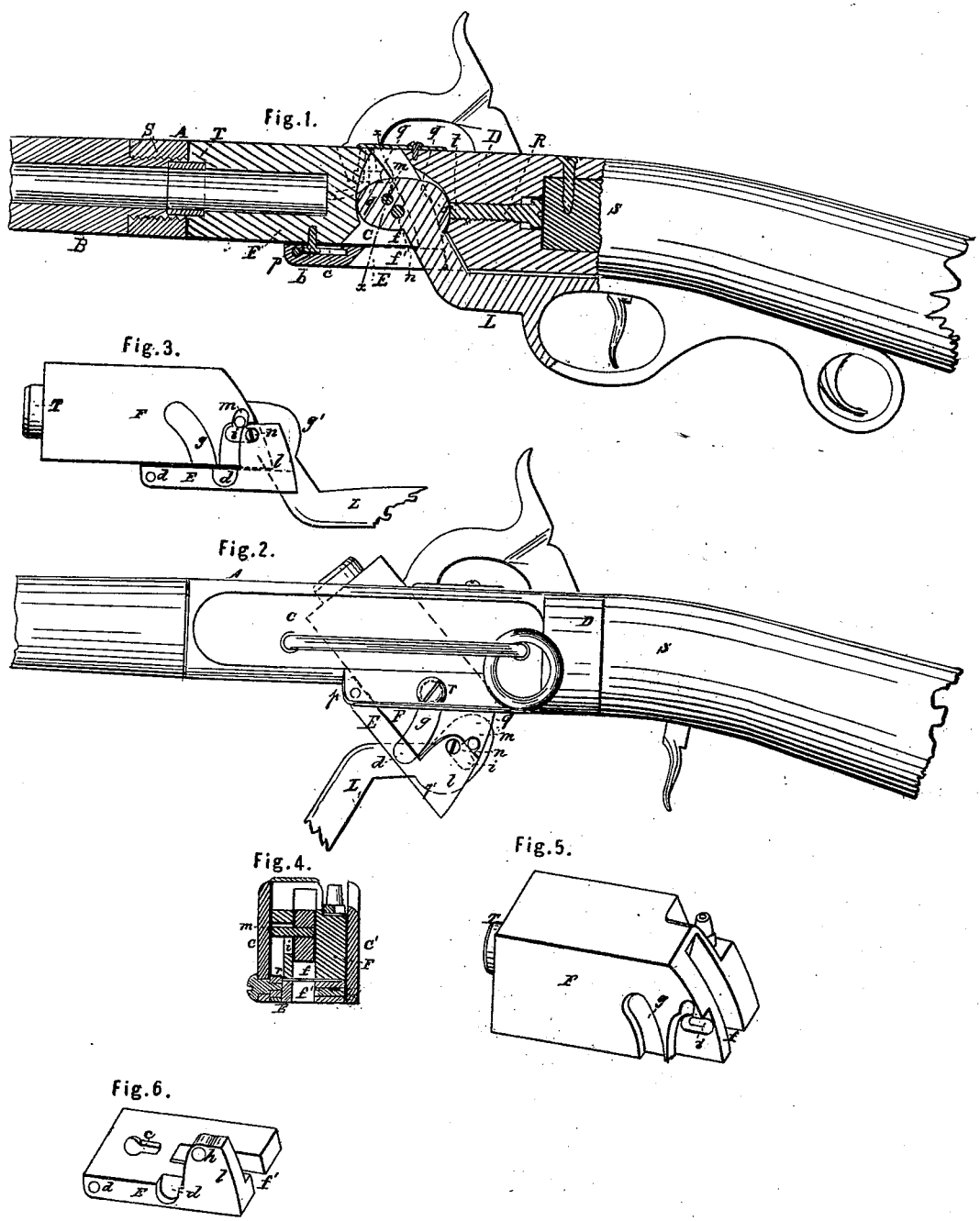
WITNESSES.
INVENTOR.

UNITED STATES PATENT OFFICE.

HENRY GROSS, OF TIFFIN, OHIO.

IMPROVEMENT IN BREECH-LOADING FIRE-ARMS.

Specification forming part of Letters Patent No. 25,259, dated August 30, 1859.

*To all whom it may concern:*

Be it known that I, HENRY GROSS, of Tiffin, in the county of Seneca and State of Ohio, have invented a new and useful Improvement in Breech-Loading Fire-Arms; and I do hereby declare that the following is a full, clear, and exact description of the same, reference being had to the annexed drawings, forming part of this specification, in the several figures of which similar characters of reference denote the same part.

Figure 1 is a longitudinal section of the fire-arm, taken through axis of bore, showing chamber in position for discharge. Fig. 2 is a side view of the piece, showing chamber in position for loading. Fig. 3 is a side view of chamber and parts connected therewith in position of Fig. 1. Fig. 4 is a cross-section on line $x\,x$, with the parts in position of Fig. 3. Fig. 5 is a perspective view of chamber detached. Fig. 6 is a perspective view of bed-piece detached.

The fire-arm here considered is of the chambered construction, the loading being effected by retracting and revolving the chamber, and after the insertion of the cartridge turning the chamber, moving it forward so as to pack the joint and brace it in the rear, these several operations being performed by the movement of a single lever.

The invention relates to the peculiar manner of sliding and turning the chamber, and to the manner of bracing it when in position for firing, and to the closing of the joint, its nature consisting in giving the chamber its longitudinal motion upon a bed-piece fixed in position during such movement, and so connected with the operating-lever and the cheek-pieces of the fire-arm as to revolve about its connection with the said cheeks and carry the chamber with it, under the circumstances hereinafter to be described, for elevating the mouth of the chamber to receive the cartridge, and restoring it in line of the bore after loading; also, to the construction of the operating-lever and its connection with the aforesaid parts, the details of construction and operation being as follows:

In the drawings, B is the barrel, screwed into head-piece A of cheek C C', between which the chamber moves, D being the base-piece connecting said cheeks in rear, and firmly secured to stock S.

E is the bed-piece, connected with cheeks C C' by a pin, $p$, passing through an opening, $a$, in its forward extremity, so that said bed-piece will move about this attachment and carry with it the chamber F by reason of the connection formed by the headed pin $b$ and flanged slot $c$.

In the side of the bed-piece E is a cavity, $d$, which, when the chamber F is drawn back upon the bed-piece, connects with and forms part of the curved groove $g$ in the side of the chamber, the whole groove then being concentric with pin $p$, about which the movable portion of the arm turns.

Projecting from the inner face of cheek C is a roller, $r$, Fig. 4, which, when the chamber F reaches the limit of its retraction, passes from cavity $d$, where it had previously rested, into the groove $g$, and permits the movement about pin $p$ until the roller reaches the head of the groove, as shown in Fig. 2. When the bed-piece is moved up between the cheeks, after loading, the roller $r$, traversing in groove $g$, prevents any longitudinal movement of the chamber until it enters cavity $d$. Then the chamber is free to obey the impulse given by the operating-lever and move forward. The two parts of groove $g\,d$ have the relative position shown in Fig 3 when the chamber is in position of Fig. 1, the roller $r$ then resting in the cavity $d$, which constitutes the lower portion of said groove $g\,d$.

The chamber F and bed-piece E are slotted in rear, as shown at $f\,f'$ in Figs. 5 and 6, for the reception of the head of the operating-lever L. This lever is connected with the chamber by pin $m$, and with the bed-piece by pin $n$, passing through opening $h$ in lug $l$ of bed-piece and slot $i$ of the chamber. The action of pin $n$ is that of a fulcrum, while pin $n$ constitutes the attachment of the lever and chamber. The head of the lever is formed with two eccentrics, $q\,q'$, the former of which wedges against the rear of the chamber, and the latter against an adjustable pressure-piece, $t$, both bearings being in the line of the bore, so that when the discharge takes place all pressure is removed from the pins. The projecting thimble T is shrunk into the end of the chamber F, and formed so as to fit tight into the base of the barrel, its extremity being ground so as to fit accurately against its seat S', so that when forced thereon a perfectly tight joint is produced.

The joint operation of the several parts above described is as follows: Commencing with the position shown in Fig. 1, by depressing lever L it is made to turn about pin $n$, causing pin $m$ to draw chamber F backward upon the bed-piece E until the two portions of groove $g\ d$ connect, and the passage of roller $r$, as before described, permits the entire system to turn about pin $p$ into the position shown in Fig. 2. After the insertion of the cartridge, by moving lever L backward the chamber and bed-piece will be turned up to a position between the cheek C C', since roller $r$ and the upper part of groove $g$ prevent any movement of the chamber upon its bed. When the roller $r$ reaches cavity $d$, the chamber is free to move forward on the bed-piece by the connection of pin $m$ and the chamber, the slot $i$ passing over pin $n$. The chamber is thus thrust firmly against seat S', and held by the eccentrics $q\ q'$ pressing against their respective bearing-surfaces. When by the wear of eccentric $q'$ it might become loose, it is only necessary to turn the screw R and advance the bearing-surface $t$.

The simplicity of construction of this fire-arm renders it easy to operate and not liable to become deranged, both of which are essential requisites for military service.

This fire-arm may be so modified as that the cartridge will be inserted in the barrel instead of in the movable chamber, as herein described, in which case the movable portion will be shortened and the chamber made to constitute a base-piece in rear of the barrel. Its retraction and revolution to permit the loading will, however, be effected by the same means as herein described, with such modification as the nature of the case will require.

I am aware that the employment of a double-headed lever in the arrangement patented by I. C. Howe, October 31, 1854. This construction and the operation thereof I disclaim as forming no part of my invention.

What I claim, and desire to secure by Letters Patent, is—

1. Giving the chamber its longitudinal motion upon a bed-piece which remains fixed during such motion, and in revolving carries with it the chamber, substantially as specified.

2. The roller $r$ or its equivalent upon the cheek-piece, and its combination with the groove $g\ d$, substantially as and for the purpose set forth.

3. The double eccentric head of the lever L, when connected with the chamber and bed-piece, substantially as described.

4. The adjustable bearing-piece for the eccentric $q'$ of lever L.

In testimony whereof I have hereunto signed my name before two subscribing witnesses.

HENRY GROSS.

Witnesses:
GEO. PATTEN,
JOHN S. HOLLINGSHEAD.